US010867033B2

(12) United States Patent
Keren et al.

(10) Patent No.: US 10,867,033 B2
(45) Date of Patent: Dec. 15, 2020

(54) LOAD DISTRIBUTION ENABLING DETECTION OF FIRST APPEARANCE OF A NEW PROPERTY VALUE IN PIPELINE DATA PROCESSING

(71) Applicant: MICROSOFT TECHNOLOGY LICENSING, LLC, Redmond, WA (US)

(72) Inventors: Shai Keren, Tel Aviv (IL); Ido Barav, Tel Aviv (IL); Avihai Berkovitz, Tel Aviv (IL); Shai Kaplan, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 15/928,830

(22) Filed: Mar. 22, 2018

(65) Prior Publication Data

US 2019/0294781 A1 Sep. 26, 2019

(51) Int. Cl.
*G06F 21/71* (2013.01)
*G06F 21/55* (2013.01)
*G06F 16/13* (2019.01)
*G06F 21/60* (2013.01)

(52) U.S. Cl.
CPC ............ *G06F 21/55* (2013.01); *G06F 16/137* (2019.01); *G06F 2221/034* (2013.01)

(58) Field of Classification Search
None
See application file for complete search history.

(56) References Cited

U.S. PATENT DOCUMENTS

| 7,181,731 | B2* | 2/2007 | Pace | G06F 8/60 |
| | | | | 717/136 |
| 7,646,708 | B2* | 1/2010 | McGee | H04L 47/10 |
| | | | | 370/229 |
| 9,473,363 | B2* | 10/2016 | Lyle | H04L 67/1029 |
| 2004/0064693 | A1* | 4/2004 | Pabla | H04L 67/104 |
| | | | | 713/168 |
| 2007/0201378 | A1* | 8/2007 | Tarkiainen | H04L 51/00 |
| | | | | 370/252 |
| 2009/0252036 | A1* | 10/2009 | Fong | H04L 45/00 |
| | | | | 370/231 |

(Continued)

OTHER PUBLICATIONS

Scalable Object Storage with Resource Reservations and Dynamic Load Balancing. Aizman et al. IEEE. (Year: 2016).*

*Primary Examiner* — Venkat Perungavoor
(74) *Attorney, Agent, or Firm* — Rainier Patents, P.S.

(57) ABSTRACT

When processing events associated with a group comprising multiple different sub-groups, a hash function can be applied to the sub-group identifier to map the events associated with the sub-group to different computational elements used to process the group's events. The hash value can be a number between 1 and n or 0 and n−1 where n is the number of computational elements available to the group. Data concerning the last time a particular value for a property was encountered in an event stream can be retained. On each computational element assigned to the group, the detection of a particular property value in an event of a sub-group can be collected, periodically aggregated and sent to each of the computational elements used by the group, thereby enabling the first detection of a new property value within a group of events to be determined.

20 Claims, 4 Drawing Sheets

(56) References Cited

U.S. PATENT DOCUMENTS

| | | | |
|---|---|---|---|
| 2010/0162260 A1* | 6/2010 | Ibrahim | G06F 9/505 718/105 |
| 2014/0115706 A1* | 4/2014 | Silva | H04L 63/1425 726/23 |
| 2014/0149502 A1* | 5/2014 | Rajaram | H04L 65/403 709/204 |
| 2014/0317738 A1* | 10/2014 | Be'ery | H04L 63/14 726/23 |
| 2016/0065672 A1* | 3/2016 | Savage | H04L 67/1095 709/219 |
| 2016/0164905 A1* | 6/2016 | Pinney Wood | G06F 21/577 726/25 |
| 2016/0224609 A1* | 8/2016 | Seekircher | G06F 16/178 |
| 2016/0349999 A1* | 12/2016 | Adler | G06F 3/065 |
| 2017/0262777 A1* | 9/2017 | Mohen | G06Q 10/0631 |
| 2018/0025021 A1* | 1/2018 | Jain | G06F 16/183 707/626 |
| 2018/0052902 A1* | 2/2018 | Leiseboer | H04L 9/14 |
| 2018/0062928 A1* | 3/2018 | Beveridge | H04L 41/046 |
| 2018/0081960 A1* | 3/2018 | Raman | G06F 16/9535 |

\* cited by examiner

LOAD DISTRIBUTION ENABLING DETECTION OF FIRST APPEARANCE OF A NEW PROPERTY VALUE IN PIPELINE DATA PROCESSING

BACKGROUND

Traditionally, computers operated serially. That is, the executing software program was executed one instruction at a time. When one instruction completed, the next instruction executed. In contrast, parallel computing uses multiple computational elements simultaneously so that each computational element executes a part of the program or processes a portion of the data. Computational elements can include a single computer, a single computer with multiple processors, multiple computers in a network, specialized hardware, or any combination thereof.

SUMMARY

When processing events associated with a group comprising multiple different sub-groups, a hash function can be applied to the sub-group identifier to map the events associated with the sub-group to different computational elements used to process the group's events. Instead of sending all the events of the group to a single computational element, the events associated with a particular sub-group can be sent to a computational element identified by the hash value of the sub-group identifier. The hash value can be a number between 1 and n or 0 and n−1 where n is the number of computational elements assigned to the group.

Data concerning the last time a particular value for a property was encountered in an event stream of a group can be retained. On each computational element assigned to the group, data about the appearance of a new (previously undetected) property value in an event of a sub-group can be collected. The data can be periodically aggregated, thereby enabling the first appearance of the property value within a group's events to be determined. The aggregated data can be sent to all the computational elements used by the group. Data such as for example, an alert or a report, including the first time at which the previously undetected property value occurred and/or the sub-group in whose event data the property value was detected can be reported to interested parties. The appearance of a previously undetected property value in event data may be indicative of a security issue. "First appearance of a previously undetected property value" can be the first appearance of the property value in an event that occurred at a time that exceeds a configurable time period from the last time at which that value occurred in the group's event stream.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
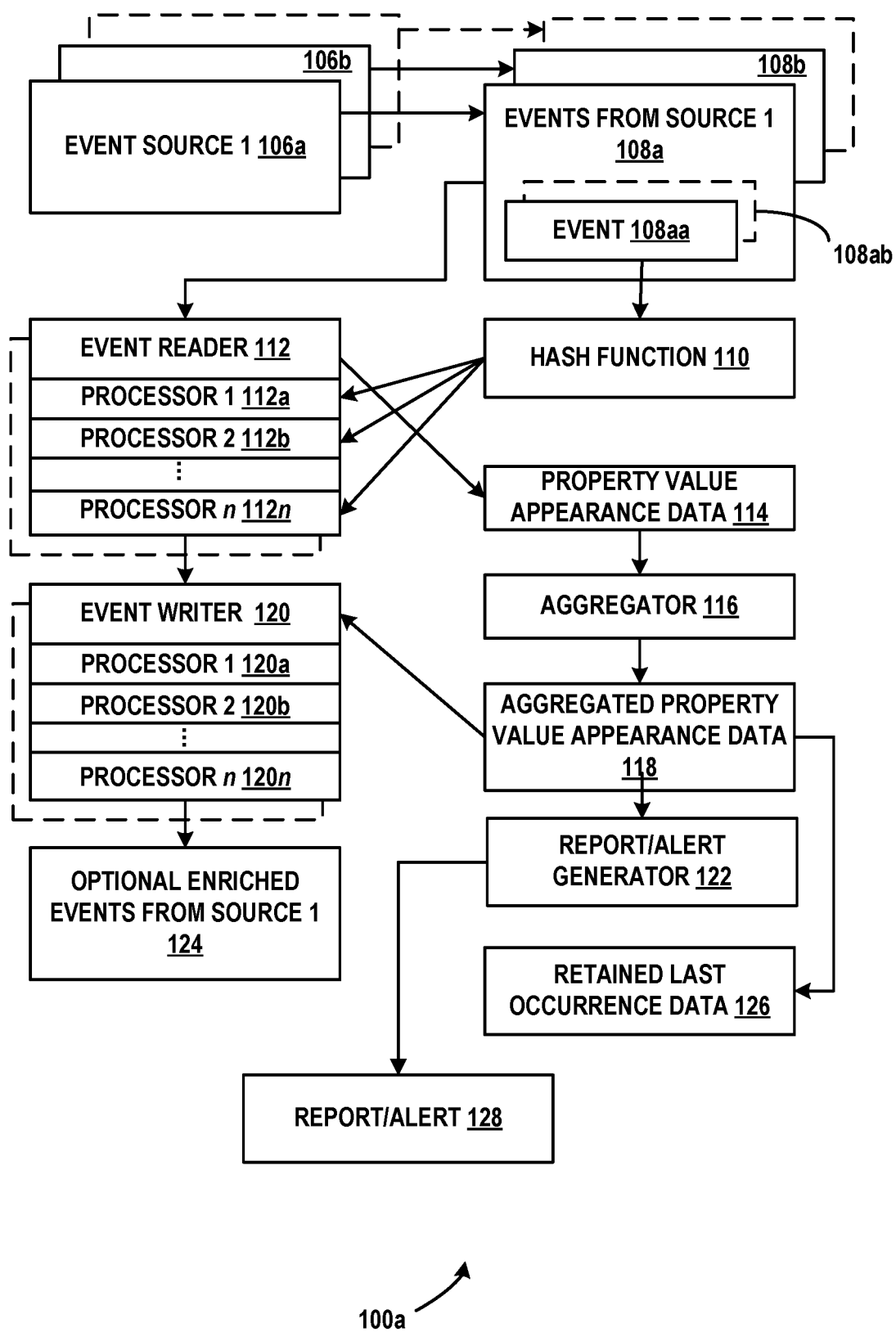
FIG. 1a is a block diagram 100a representing an example of a system that uses load distribution to enable the detection of the first appearance of a previously undetected property value in event data of a group in accordance with aspects of the subject matter disclosed herein.

Groups that generate events can vary widely in the number of events that are generated. Typically, all the events generated by a group are sent to one computational element. When all the events associated with a group are processed by the same computational element, memory, data and state can be shared. Because one group may generate many more events than another group, the computational element assigned to the processing of a first group's events may process many more events than does a computational element that processes the events of a second group. Some groups may generate so many events that all the events of the group cannot be processed by a single computational element. Thus, it can be helpful to be able to distribute the events of a group among several computational elements, however in doing so, memory, data and state typically are no longer be able to be shared by the group. In accordance with aspects of the subject matter disclosed herein, the events of a single group can be divided among several (e.g., n computational elements) and events can be generated to synchronize the state in the group. The computational elements may execute simultaneously. The computational elements may operate in a distributed, networked computational environment.

In accordance with aspects of the subject matter disclosed herein, a group can include multiple sub-groups. A hash function can be applied to the identifier of each sub-group so that the events of a group are distributed between multiple computational elements. All the events of one sub-group can be sent to the same computational element. Because one sub-group can generate more events than another sub-group, the events of the group may be distributed unevenly. That is, one computational element may receive a potentially significantly greater amount of events that does another computational element, as load distribution does not necessarily result in load balancing. In load balancing, processing originally intended to occur on one computational element is transferred, usually in the background, from a first computational element that is overloaded to a second computational element that has a lesser load.

Load balancing is typically performed to increase throughput, reduce response time and avoid overloading individual computational elements. In contrast, load distribution as described herein, enables the first appearance of a previously undetected property value to be detected. The property value can be described as "new" if the value has not been seen in a configurable time period. For example, if the configurable triggering time period is 90 days, a "new" property value p can be a value that has not been encountered in the event data in the last 90 days.

In accordance with aspects of the subject matter disclosed herein, the event data generated by a single group can be processed by multiple event processors. An event processor can include an event reader. An event processor can include an event writer. The event processors can be on different computational elements in a distributed network. An event reader for a sub-group's data can execute on a different computational element than does the sub-group's event writer. The data generated by the group can be distributed to the different event processors by applying a hash function to the sub-group identifier so that all the events associated with a particular sub-group identifier can be sent to the same event processor. This part of the processing can occur in a first processing layer. The first processing layer can also include processing that extracts data from the events associated with each sub-group to determine a first appearance of a new (previously undetected) property value in the event data for the sub-group.

In a second processing layer the new property value data for each sub-group can be aggregated to determine the first appearance of the property value in the event data for the group. Duplicate detections of appearances of the new property value can occur within event data of the same sub-group and in event data of the group. The second processing layer can aggregate the first appearance of the property value data for the sub-groups to remove duplicate detections and can synchronize the event data on the computational elements of the second layer. That is, for example, the first appearance of a property value p can occur at time t in one sub-group (e.g., sub-group A) and can occur at time t+6 in a second sub-group (e.g., sub-group B), and so on, where t+6 occurs after t. Because sub-group A's event data is being processed on a first computational element and sub-group B's event data is being processed on a second computational element that does not share data, memory and state with the first computational element, without synchronization, the time at which the property value p was encountered in sub-group A's event data will not be known to the second computational element and vice versa.

The aggregation of the event data of the sub-groups can ascertain which occurrence of p is the first occurrence of property value p (e.g., at time t in sub-group A's event data). A notification can be generated by the aggregator which can be sent to all the computational elements processing the group's events so that all the computational elements are made aware that, for example, the first occurrence of property value p occurred at time t in sub-group A's event data. An alert and/or report can be generated. The alert/report can identify the property value, the time of the first appearance of the property value in the event data of the group and the sub-group in which the property value first appeared. The alert can be sent to a security center or administrator of the group and/or to one, several or all of the sub-groups.

As described above, in accordance with some aspects of the subject matter disclosed herein events generated by a group can be distributed to different computational elements by applying a hash function to a sub-group identifier. The hash function can return a value corresponding to one of n computational elements available to the group. For example, all the events generated by a first sub-group can be sent to a first computational element identified by the hash of the sub-group identifier, all the events generated by a second sub-group can be sent to a second computational element, and so on. Multiple sub-groups can be assigned to the same computational element but all of the events of one sub-group will always go to the same computational element. For example, suppose there are 20 computational elements and 1000 sub-groups. 50 sub-groups can be assigned to each computational element but events of a particular sub-group (sub-group U, for example) will always go to the same computational element (e.g., computational element E).

The last time a property value p was encountered within the events of the group can be retained and used to determine if generation of a report or an alert will be triggered. A triggering time period for the report and/or alert can be configured. Information about the event in which the property value appears can be collected from each event at each of the computational elements dedicated to the processing of the group's events. Information collected can include but is not limited to the group, the sub-group, the property value and the time at which the event was generated or associated.

For example, suppose a property p in the event data represents a country from which the event was generated. Suppose the last time anyone in the group generated an event from China was 30 hours ago. Suppose the time beyond which an alert is triggered is 10 hours. Suppose an event is received, in which the data in the event indicates that a sub-group such as a user U, a student at a University located in the United States of America logged into the University website from China and generated an event at time t+11. Suppose the user U also generated events at time t+12 and at time t+16 with country=China. Because most students at the University located in the United States of America log in and generate events from the United States of America, a student logging in and generating events from China may be suspicious. For example, the person logging in from China may be an imposter or malicious actor, and not user U, the student, at all. Because the property value China has not been encountered for 30 hours, which exceeds the triggering time period of 10 hours, a report and/or an alert can be generated. The report and/or alert can be generated on the first event in which China is encountered for the country property for the group.

Now suppose that in addition to user U generating an event from China at time t+11, time t+12 and time t+16, the other member of the group, user UU whose event data is being processed on computational element EE generated an event from China at time t+4, and at time t+15. In this example, the first event generated by user U was generated at time t+11 and the first event generated by user UU was generated at time t+4. Because user UU is operating on a different computational element, the information that an event was generated from China first at time t+11 by user U will be inaccessible to user UU's computational element and the information that user UU using computational element EE generated an event from China at time t+4 will be inaccessible to user U. The information on the detection of an event generated in China can be aggregated and provided to each of the computational elements of the group so that the earliest detection of the property value "China" and the user who generated the event from China first among the sub-groups can be provided. With respect to the example, the first event data from users U and UU can be aggregated to determine that the first event generated from the group including users U and UU is the event created by user UU at time t+4.

This information can be provided to all the sub-groups of the group. This information can be provided to the administrator or other party associated with the group. This information can be provided to parties in the form of an event. The event can be generated by an event generator. That is, for example, the information that user UU generated a new event (logging in from China) can be provided to a security center for the University. It will be appreciated that property detection for multiple properties and property values can be collected, aggregated and provided to the other processors processing the event data for the group.

Load Distribution Enabling Detection of First Appearance of a New Property Value in Pipeline Data Processing FIG. 1a is a block diagram representing an example of a system 100a that uses load distribution to enable the detection of the first appearance of a previously undetected property value in event data of a group in accordance with aspects of the subject matter described herein. System 100a can be a system that is a part of a data processing pipeline. A pipeline is a set of sequential data processing elements, in which the output of one element is the input of the next one. The pipeline can be a stream processing pipeline. The pipeline can be an event stream processing pipeline that processes streams of event data. All or portions of system 100a may reside on one or more computers or computing devices such as the computers described below with respect to FIG. 3. System 100a or portions thereof may be provided as a stand-alone system or as a plug-in or add-in.

System 100a or portions thereof may include information obtained from a service (e.g., in the cloud) or may operate in a cloud computing environment. Cloud computing enables access to shared pools of configurable system resources. It can also provide various services that can be set up rapidly with little effort. Sharing of resources provides economies of scale. Cloud computing enables an entity to focus on its actual business instead of having to provide its own computer infrastructure and maintenance. A cloud computing environment can be an environment in which computing services are not owned but are provided on demand. For example, information may reside on multiple devices in a networked cloud and/or data can be stored on multiple devices within the cloud. Cloud providers typically use a "pay-as-you-go" paradigm. In accordance with aspects of the subject matter disclosed herein, operating in a cloud computing environment provides the advantage of large quantities of data for analysis.

System 100a can include one or more computing devices. Contemplated computing devices include but are not limited to desktop computers, tablet computers, laptop computers, notebook computers, personal digital assistants, smart phones, cellular telephones, sensors, mobile telephones, servers, virtual machines, devices including databases, firewalls and so on. A computing device can include one or more processors and a memory that communicates with the one or more processors.

System 100a may include one or more program modules which when loaded into the memory and accessed by the one or more processors configure the processor or processors to perform the actions attributed to the one or more program modules. System 100a can include one or more event sources such as event source 1 106a, event source 106b, etc. identified by a group identifier. An event source can be a group that includes sub-groups. A group can be a group of users. An event source can be a tenant. A tenant is a group of users who share a common access to a software system. In multi-tenancy systems, a single instance of software runs and serves multiple tenants. System 100a can be but does not have to be a multi-tenancy system. The software in a multi-tenancy system can be designed to provide each tenant a dedicated share of the instance. The instance can include data, configuration settings, management services, individual functionality for the tenant and non-functional properties. A tenant can be identified by a tenant identifier.

System 100a can include events such as events from source 1 106a, events from event source 2 106b, etc. Event source 1 106a can generate events such as events from source 1 108a, event source 2 106b can generate events from source 2 108b and so on. An event is a software message indicating that something has happened. An event can be an action or occurrence that is recognized by the software and that can be acted upon by the software. An event can be generated or triggered by the system, by a user, by a hardware device or in other ways. Events can be originated by a human user or by a hardware device such as a timer, sensor, etc. An event can be a keystroke, mouse click, or data sent from a sensor. An event can describe an action a user takes on a cloud service, such as but not limited to logging in to a website or service, sending an email, downloading a file, and so on. Software can generate events. In accordance with aspects of the subject matter disclosed herein, an event can be identified by an identifier comprising a group identifier and a sub-group identifier. A sub-group can be an entity such as but not limited to a user, a device, an IP address, an identifier identifying a particular computing device, and so on. A sub-group can be identified by an identifier comprising a group identifier identifying the group to which the sub-group belongs and a sub-group identifier. Events from events sources such as events from source 1 108a can include events such as event 108aa, event 108ab, etc. Each event can be identified and/or keyed by an identifier comprising a group identifier and a sub-group identifier.

System 100a can include a hash function such as hash function 110. A hash function is a function that can be used to map data of one size to data of a second, typically fixed size. A hash function returns a value often referred to as the hash value, hash code or hash. For example, a hash function such as hash function 110 can receive a sub-group identifier for an event such as an event 108aa in events from source 1 108a. The hash function can be applied to the sub-group identifier to map the events associated with the sub-group to one of several different computational elements used to process the group's events. For example, the sub-group identifier of event 108aa can be hashed to determine to which computational element such as event reader 112 processor 1 112a, processor 2 112b . . . processor n 112n of event reader 112 event 108aa is sent.

System 100a can include multiple event readers on multiple computational elements, such as, for example, an event reader such as event reader 112, etc. Event reader 112 can collect data from events for each sub-group before forwarding the events on. System 100a can include property value detection data such as property value appearance data 114. The event reader 112 can collect and retain property detection data such as property value appearance data 114 from the event. For example, event reader 112 may collect data and retain data such as one or more of but not limited to: the group identifier of the event that includes the property value, the sub-group identifier of the event, the hash value of the sub-group identifier of the event, a value of a property in the event and a time at which the event including the property value was generated or is associated. Differences in time values due to differences in system clocks can be accounted for, as is known in the art.

System 100a can include an event data aggregator such as aggregator 116. Periodically, (e.g., once a minute or any other configured aggregation time period) the property value appearance data 114 can be provided to aggregator 116. In accordance with some aspects of the subject matter disclosed herein, the aggregator 116 can notify every computational element processing the group's events (e.g., in the event writer 120) of the first appearance of the new property value in the group's events if the first appearance of the new property value in the group's events exceeds an alert-triggering threshold, as described above. Because each computational element only receives a portion of the events of a group, multiple instances of the new property value can occur, but all but one of the occurrences is not the first appearance of the new property value.

Duplicate detections of the new property value can be filtered out by the aggregator 116 if an earlier detection is found in any of the sub-groups of the group. Keying the data by group identifier or sub-group identifier is not a performance issue because the number of the detections are few in relation to the number of events. Hence, aggregator 116 can determine the earliest group-wide detection of a new property value in the aggregated property value appearance data 118 and can send this data to all the computational elements such as processor 120a, processor 120b . . . processor 120n of event writer 120. Event writer 120 can enrich the event data with this data before forwarding the event data to the next step in the pipeline. System 100a can include an alert/report generator such as report/alert generator 122. The first appearance of a newly-encountered value for a property can be sent to an alert/report generator 122 that generates an alert or report and sends the alert/report to an appropriate party or parties. This information can be retained in retained last occurrence data 126 to determine when the next time the property value is encountered is a "new" or previously undetected occurrence, as "new" is defined herein.

Figure 1B:
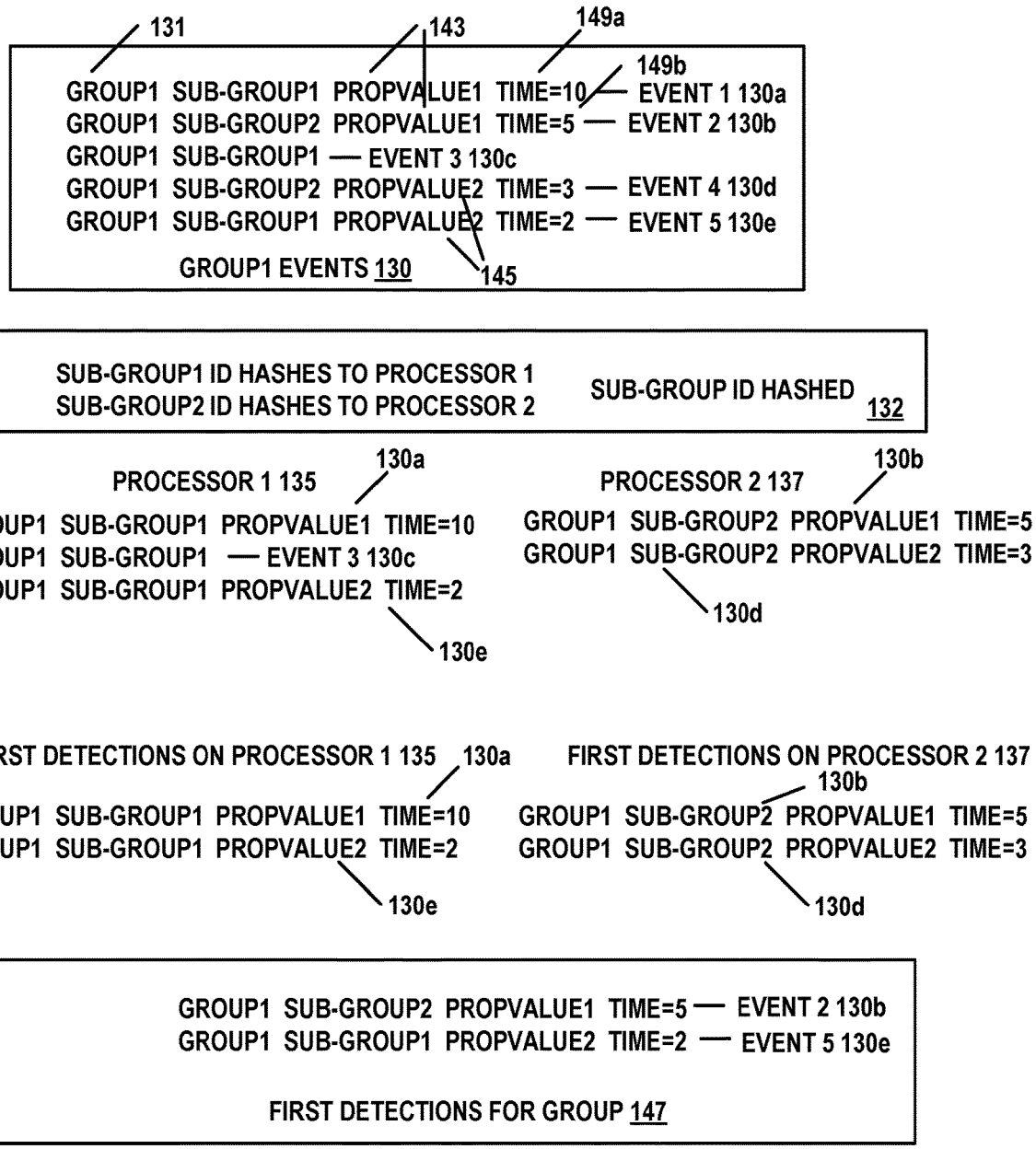
FIG. 1b is a block diagram 100b representing example data for a system that uses load distribution to enable the detection of the first appearance of a previously undetected property value in event data of a group in accordance with aspects of the subject matter disclosed herein.

FIG. 1b is a block diagram 100b representing example data for a system that uses load distribution to enable detection of the first occurrence of a new property value in pipeline data processing in accordance with aspects of the subject matter disclosed herein. Suppose that the triggering time period is configured to be 90 days for property value 1 and 90 days for property value 2 and time=0 represents a time that exceeds 90 days. Hence events associated with a time of 0 or greater can be alert-generating events. Thus alerts are to be raised for events including property value 1 143 and property value 2 145. Group 1 Events 130 includes events from a single group, group 1 131. Group 1 131 includes 2 sub-groups, sub-group 1 (associated with event 1 130a, event 3 130c and event 5 130e). Group 1 131 also includes sub-group 2 (associated with event 2 130b and event 4 130d). The sub-group identifier for events of Group 1 events 130 can be provided to a hash function as described above. As illustrated in box 132, the hash function can hash the identifier of sub-group1 and send the events of the first sub-group to the processor identified by the hash value (e.g., to processor 1 135). The hash function can hash the identifier of sub-group2 and send the events of the second sub-group to the processor identified by the hash value (e.g., to processor 2 137). Hence, event 1 130a, event 3 130c and event 5 130e can be sent to processor 1 135 and event 2 130b and event 4 130d can be sent to processor 2 137.

Periodically, in accordance with a configurable aggregation time period, the events processed by processor 1 135 and the events processed by processor 2 137 or data extracted from the events can be sent to the aggregator as described above. The aggregator can exclude event 3 130c from consideration because event 3 130c does not refer to either property value 1 or property value 2. Alternatively, event 3 130c may be excluded from being sent to the aggregator. The aggregator can aggregate event 1 130a and event 5 130e and thus can determine that the earliest detection on processor 1 135 of property value 1 (propvalue1 143) in sub-group 1 is event 1 130a and that the earliest detection of property value 2 (propvalue2 145) in sub-group 1 is event 5 130e. Similarly, the aggregator can determine that the earliest detection on processor 2 137 of property value 1 (propvalue1 143) in sub-group 2 is event 2 130b and that the earliest detection of property value 2 (propvalue2 145) in sub-group 2 is event 4 130dd. Alternatively, only the event that occurs at the earliest time for each sub-group can be sent to the aggregator. This can be done by overwriting an earliest event variable for a property value for a sub-group whenever an earlier event is encountered by the event reader.

The time for the earliest (first) detection on processor 1 135 of property value 1 (time=10 149a) and the time for the earliest (first) detection on processor 2 137 of property value 1 130b (time=5 149b) can be compared to determine that the earliest (first) detection of property value 1 143 for the group 147 occurs in event 2 130b (time=5 149b), and can send this information to update the events of all the sub-groups. Similarly, the time for the earliest (first) detection on processor 1 135 of property value 2 (time=3 151a) and the time for the earliest (first) detection on processor 2 137 of property value 2 145 (time=2 151b) can be compared to determine that the earliest detection of property value 2 145 for the group 147 occurs in event 5 130e (time=2 151b). This information can be sent to update the events of all the sub-groups.

Figure 2:
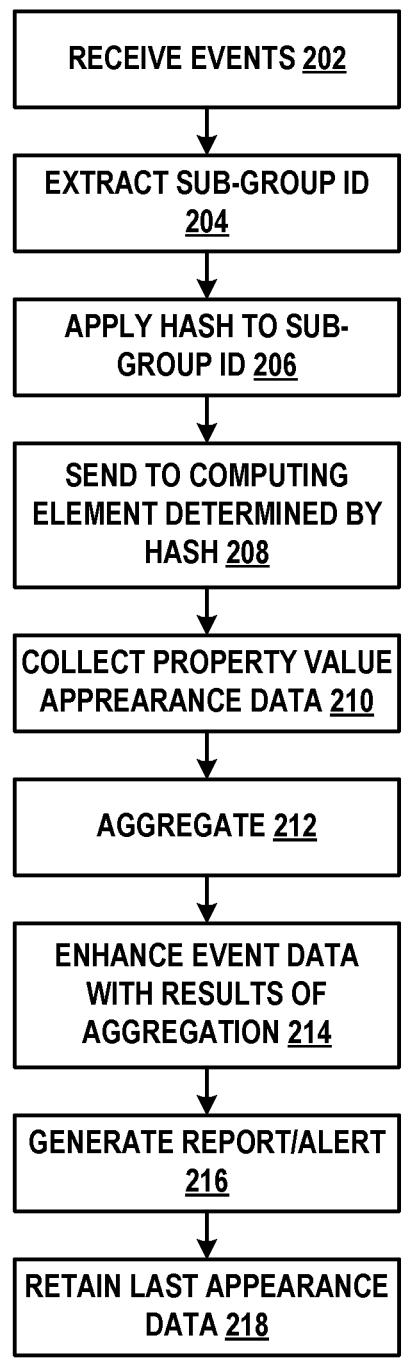
FIG. 2 illustrates an example of a method 200 that uses load distribution to enable detection of the first appearance of a property value in event data of a group in accordance with aspects of the subject matter described herein.

FIG. 2 illustrates an example of a method 200 for generating an alert in accordance with aspect of the subject matter disclosed herein. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated. Method 200 or portions thereof may be executed by a system or a portion of a system such as system 100a as described above.

At operation 202 events can be received from an event source. For each event, at operation 204 the sub-group identifier can be extracted from the event. At operation 206 a hash function that maps a sub-group identifier to a computational element assigned to the group can be applied to the sub-group identifier. At operation 208 the event can be assigned to the one of n processors specified by the hash of the sub-group identifier. At operation 210 data about a property value can be collected. For example, data can be collected that property value 1 appeared in event data from sub-group 1 of group 1 at time t=2. The property value detection data can be collected by an event reader. In accordance with some aspects of the subject matter disclosed herein, the earliest occurring event having property value 1 for sub-group 1 can be determined.

Optionally, the unchanged event can be forwarded to a next step in a pipeline. At operation 212 the new property value data from all the sub-groups can be aggregated and filtered to determine the earliest (first) detection of the property value within a specified time period for the group. If the time from the last time the property value appeared exceeds a triggering threshold as described more fully above, at operation 214 the event data can be updated with the aggregated filtered property value data. At operation 216 information about the first occurrence of the new property value data can be reported. The report can take the form of an alert. The information can include the group in which the first occurrence of the new property value was detected, the sub-group in whose event data the first occurrence of the new property value was detected and the time associated with the event data. The time associated with the event data for the property value can be retained at operation 218.

Described herein is a computing device comprising a memory connected to a processor, the processor configured to detect a first appearance of a new property value in an event of an event stream of a group comprising a plurality of sub-groups, a hash function that generates a hash of an identifier of a sub-group of the plurality of the sub-groups of the group, the hash determining a computational element to which the event is sent for processing, an event reader that extracts property value appearance data from the event, an aggregator that receives the property value appearance data from a plurality of events of the plurality of sub-groups and determines a first appearance of the property value for the group in the plurality of events and a report generator that generates a report that identifies the sub-group that generated the event in which the first appearance of the property value of the group was detected, a time associated with the event in which the first appearance of the property value was detected and the property value. All the events of a sub-group of the plurality of sub-groups are sent to the computational element identified by applying the hash function to the sub-group identifier. The events of a plurality of sub-groups can be hashed to one computational element. The property value is a new property value when a time period between detections of the property value in the group's events exceed a triggering threshold. The report generator sends the report to a security center of the group. A time of an event at which a last detection of the property value occurred is retained to determine if the triggering threshold is exceeded. The group comprises a group of users sharing access to software in a multi-tenancy system. State is synchronized between the plurality of sub-groups of the group by update events.

Described herein is a method of load distribution of events in an event stream by distributing events generated by a group into n parallel computational elements comprising receiving by a processor of a computing device an event stream of events generated by a group comprising sub-groups, receiving a configurable time period which when exceeded triggers generation of a notification to the group, distributing the events between computational elements based on a hash of sub-group identifiers, extracting event data from events in the event stream, the events comprising a new property value, where a new property value is a value that has not been detected within the configurable time period, aggregating the extracted event data, determining the earliest detection for the group, sending updates to all the sub-groups of the groups and generating a notification identifying the group, sub-group and property value. The extracted event data is aggregated periodically. The aggregated data is aggregated to determine the earliest detection of the property value in a sub-group. The earliest detection of the property value in the plurality of sub-groups is filtered to determine the earliest detection of the property value in the group. All the sub-groups of the group receive an event identifying the earliest detection of the property value in the group.

Described herein is a system that detects a potential security threat, the system comprising a memory connected to a processor, the processor configured to detect a first appearance of a property value in an event stream for a group in a configurable time period by accessing retained event data identifying a last time at which the property value was detected in an event stream for the group, the group comprising sub-groups and in response to determining that a time period between the last time in the retained event data and a first new detection of the property value exceeds a configurable amount of time, triggering generation of a report comprising a potential security threat, the report identifying a group, a sub-group and a value of a property by assigning events of a sub-group of an event-generating group to one of n computational elements based on a hash value of the sub-group identifier. Property value appearance data from each event in the event stream is collected, the event comprising the property value. The property value appearance data can be aggregated, thereby eliminating duplicate detections. A notification comprising the first new detection of the property value in the group can be generated. An update comprising the first new detection of the property value in the group can be generated. The update can be sent to all the sub-groups of the group.

Example of a Suitable Computing Environment

Figure 3:
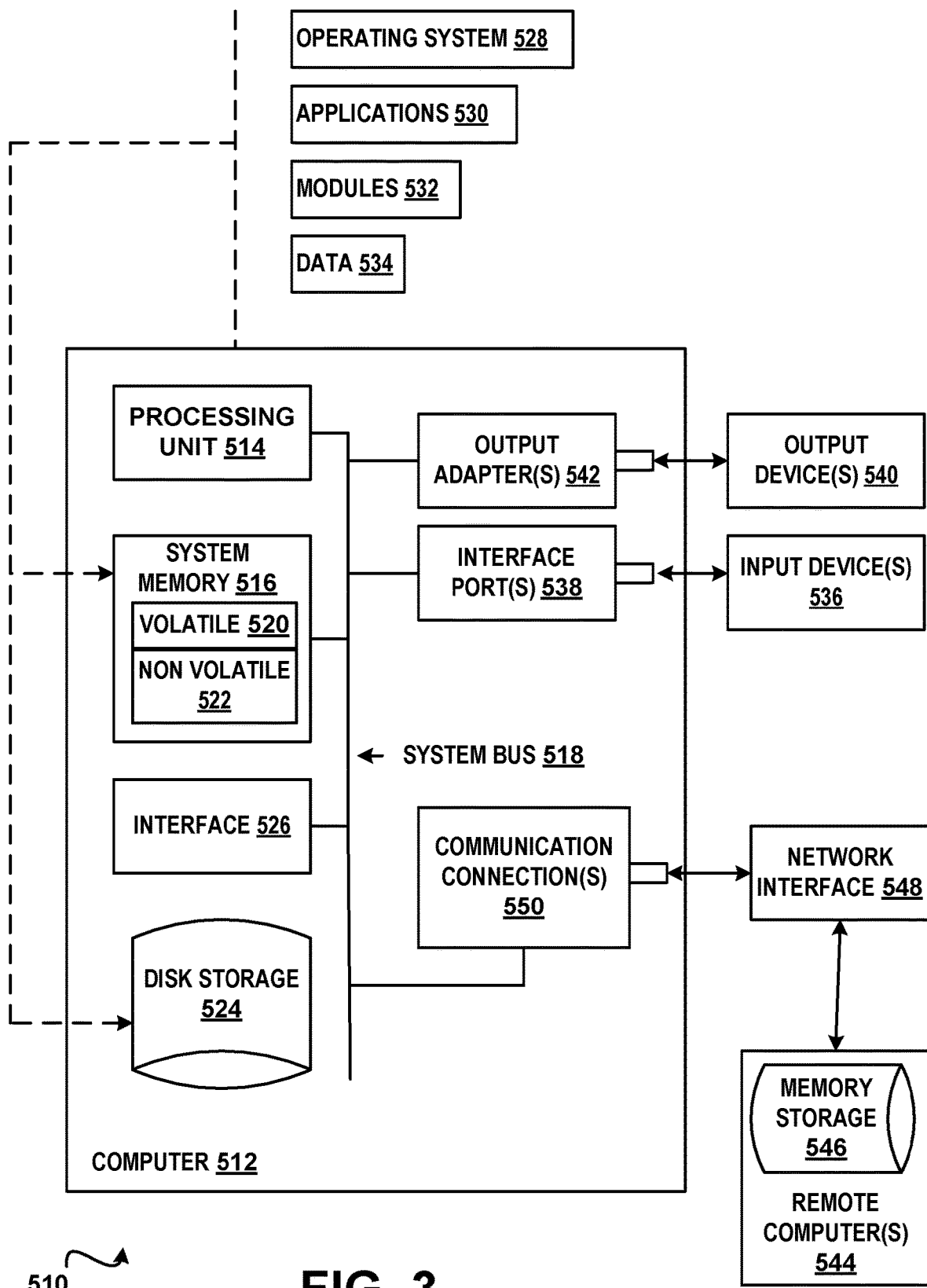
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and nonvolatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device comprising:
a processor; and
a memory connected to the processor,
the processor configured to execute instructions stored on the memory that cause the processor to:

generate hashes of identifiers associated with a plurality of sub-groups of a group, the hashes being used to divide events among a plurality of computational elements for processing;

extract appearance data representing when a particular new property value is utilized by at least two different computational elements at different times during processing of the events;

determine an initial appearance of the particular new property value according to the extracted appearance data; and send a notification to at least one to the plurality of computational elements, the notification identifying the determined initial appearance of the particular new property value, a time associated with the determined initial appearance of the particular new property value, and the particular new property value, the notification being sent for synchronizing usage of the particular new property value across the plurality of computational elements.

2. The computing device of claim 1, wherein all the events the same sub-group are processed by the same computational element.

3. The computing device of claim 1, wherein the events of a plurality of sub-groups can be hashed to one computational element.

4. The computing device of claim 1, wherein the initial appearance of the particular new property value represents the most recent appearance of the particular new property value within a triggering threshold time period since a previous appearance of the particular new property value.

5. The computer device of claim 4, wherein the processor is further configured to execute instructions stored on the memory that cause the processor to:
send a report identifying the determined initial appearance of the particular new property value to a security center of the group.

6. The computing device of claim 4, wherein the processor is further configured to execute instructions stored on the memory that cause the processor to:
retain a time of a last detection of the particular new property value to determine whether the triggering threshold time period is exceeded.

7. The computing device of claim 1, wherein the group comprises a group of users sharing access to software in a multi-tenancy system.

8. The computing device of claim 1, wherein state is synchronized between the plurality of sub-groups of the group by update events.

9. A method comprising:
receiving an event stream of events generated by a group, the group comprising sub-groups;
distributing the events among a plurality of computational elements based on hashes of sub-group identifiers such that different computational elements process different subsets of the events for different sub-groups;
obtaining appearance data representing when a particular new property value appears in a first subset of events processed by a first computational element and a second subset of events processed by a second computational element;
aggregating the appearance data to determine an initial appearance of the particular new property value in the first subset of events and the second subset of events;
generating a notification identifying the initial appearance of the particular new property value; and
providing the notification to at least one of the plurality of computational elements.

10. The method of claim 9, further comprising:
performing the aggregating periodically.

11. The method of claim 10, further comprising:
generating an alert indicating whether the initial appearance occurs in the first subset of events or the second subset of events.

12. The method of claim 10, further comprising:
generating an alert identifying the particular new property value and a time of the initial appearance of the particular new property value.

13. The method of claim 9, wherein the notification is sent to each of the plurality of computational elements.

14. A machine-readable medium storing instructions which, when executed by a machine, cause the machine to perform acts comprising:
receiving an event stream of events generated by a group, the group comprising sub-groups, wherein the events are distributed among a plurality of computational elements based on sub-group identifiers such that different computational elements process different subsets of the events for different sub-groups;
obtaining appearance data representing when a particular new property value appears in a first subset of events processed by a first computational element and a second subset of events processed by a second computational element;
determining an initial appearance of the particular new property value in the first subset of events and the second subset of events;
generating a notification identifying the initial appearance of the particular new property value; and
providing the notification to at least one of the plurality of computational elements.

15. The machine-readable medium of claim 14, the acts further comprising:
performing the determining of the initial appearance repeatedly over time to identify additional initial appearances of the particular new property value separated by a configurable amount of time.

16. The machine-readable medium of claim 14, the acts further comprising:
generating an alert indicating whether the initial appearance occurs in the first subset of events or the second subset of events.

17. The machine-readable medium of claim 14, the acts further comprising:
generating an alert identifying the particular new property value and a time of the initial appearance of the particular new property value.

18. The machine-readable medium of claim 14, wherein the notification is sent to each of the plurality of computational elements.

19. The machine-readable medium of claim 14, the acts further comprising:
receiving the event stream from a particular tenant acting as an event source of the events.

20. The machine-readable medium of claim 14, the sub-group identifiers comprising at least one of user identifiers, device identifiers, or network addresses.

* * * * *